United States Patent [19]
Kondo

[11] Patent Number: 6,157,625
[45] Date of Patent: Dec. 5, 2000

[54] AUDIO-VIDEO SIGNAL TRANSMISSION APPARATUS

[75] Inventor: Takanobu Kondo, Kanagawa, Japan

[73] Assignee: Sony Corporation, Tokyo, Japan

[21] Appl. No.: 08/987,741

[22] Filed: Dec. 9, 1997

[30] Foreign Application Priority Data

Dec. 11, 1996 [JP] Japan ................................. 8-352072

[51] Int. Cl.[7] ........................................................ H04J 3/02
[52] U.S. Cl. ........................................... 370/321; 370/337
[58] Field of Search ..................................... 370/260, 265, 370/466, 498, 321; 379/93.21; 348/15; 709/247

[56] References Cited

U.S. PATENT DOCUMENTS

5,784,572  7/1998  Rostoker et al. .................. 395/200.77
5,799,081  8/1998  Kim et al. .................................. 380/5

*Primary Examiner*—Huy D. Vu
*Assistant Examiner*—Alexander Boakye
*Attorney, Agent, or Firm*—Frommer Lawrence & Haug, LLP.; William S. Frommer

[57] ABSTRACT

In transmitting an MPEG transport stream, each audio signal packet is placed after the corresponding video signal packet when audio and video transport streams are multiplexed. If simple switching were made to switch between a plurality of programs to form a multiplexed transport stream of the programs, part of the audio packets that are placed behind would be lost to cause abnormal sound. In the invention, switching between programs is made by providing signal switching means separately for audio transport streams and video transport streams. As a result, when the program to be transmitted is changed from one program to another, the signal switching means can be switched in such a manner that none of the audio signal packets that constitute those programs are lost.

16 Claims, 9 Drawing Sheets

… (see FIG. 2H) by dividing a bit
AUDIO-VIDEO SIGNAL TRANSMISSION APPARATUS

BACKGROUND OF THE INVENTION

The present invention relates to an audio-video signal transmission apparatus and can be applied to a case of satellite-broadcasting video and audio signals that have been subjected to data compression according to the MPEG (moving picture experts group) scheme, for instance. The invention is intended to enable efficient processing of video and audio signals by recording, as separate files, a video signal transport stream and an audio signal transport stream that are formed by, for instance, a data-compressed video signal and audio signal, respectively, and multiplexing those transport streams in transmitting a program.

In conventional broadcast systems, video and audio signals are edited in the form of baseband signals and then transmitted after being modulated into a format that is suitable for a transmission line.

Figure 1:
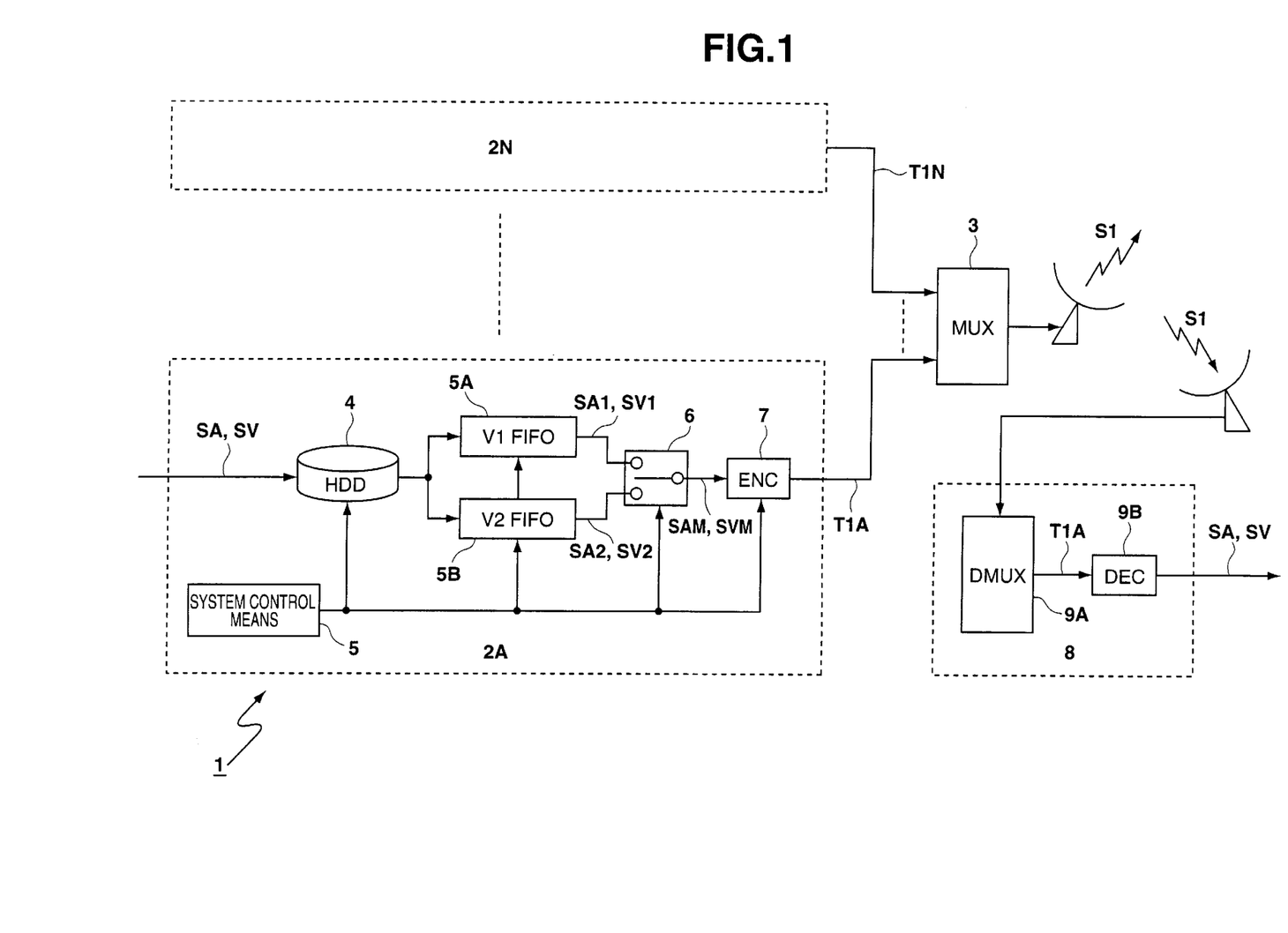
FIG. 1 is a block diagram of a conventional satellite broadcasting system.

FIG. 1 is a block diagram of a satellite broadcasting system 1 that transmits video and audio signals as MPEG transport streams. The satellite broadcasting system 1 broadcasts multiplexed transport streams T1A–T1N that are respectively output from a plurality of servers 2A–2N after time-divisionally multiplexing those with a multiplexer (MUX) 3.

Having approximately the same configuration, the servers 2A–2N each store a video signal SV and an audio signal SA in a recording device such as a hard disk drive (HDD) 4. Each of the servers 2A–2N stores and holds a video signal SV and an audio signal SA after converting those into a baseband format, and selectively output those under the control of a system control means 5.

FIFOs (first-in first-out) 5A and 5B hold, on a system-by-system basis, two systems of video signals SV and two systems of audio signals SA that are output from the hard disk drive 4 as shown in FIGS. 2A–2D. For example, while the FIFO 5A sequentially receives and outputs a video signal SV1 and an audio signal AV1 of a program that is currently broadcast (see FIGS. 2A and 2B), the FIFO 5B sequentially receives and outputs with predetermined timing a video signal SV2 and an audio signal AV2 of a commercial message that will be broadcast next (see FIGS. 2C and 2D).

A selecting means 6 selects and outputs video and audio signals that are output from the FIFOs 5A or 5B by switching between the contacts at a predetermined time point t1 under the control of the system control means 5. In this manner, the selecting means 6 sequentially outputs video signals SVM and audio signals AVM according to a preset transmission list, for instance.

Figure 2A:
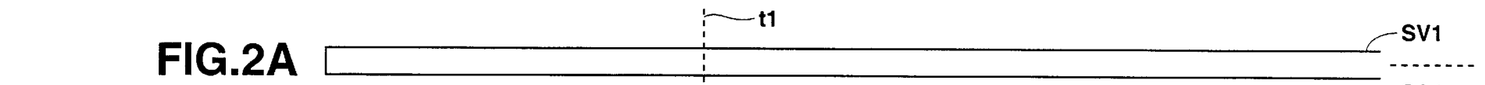
FIGS. 2A–2I are a time chart showing the operation of the satellite broadcasting system of FIG. 1.
Figure 2B:
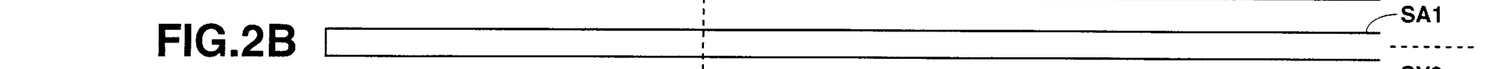
Figure 2C:
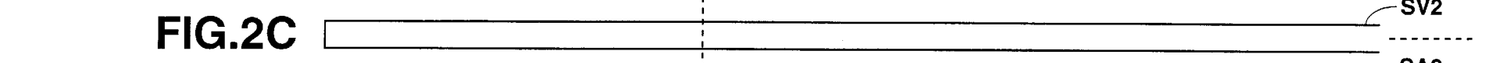
Figure 2D:
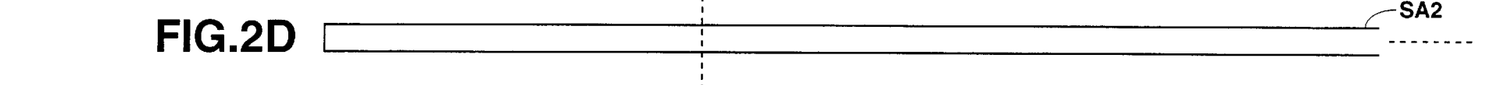
Figure 2E:
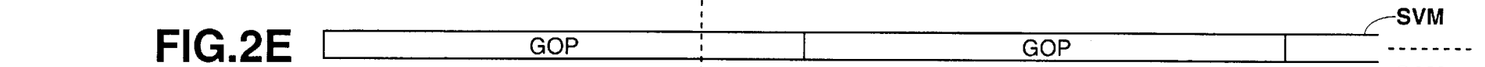
Figure 2F:
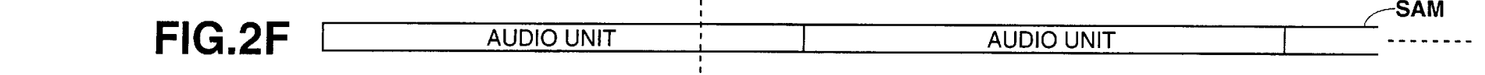
Figure 2G:
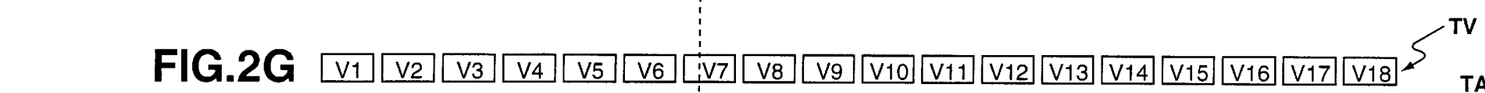

An encoder (ENC) 7 converts a video signal SVM and an audio signal AVM into an MPEG multiplexed transport stream T1A. That is, the encoder 7 divides a video signal SVM (see FIG. 2E) into GOPs (groups of pictures) and sequentially codes the GOPs according to the MPEG coding scheme. Further, the encoder 7 generates video packets V1, V2, V3, . . . (see FIG. 2G) by dividing a bit stream that has been obtained by the above coding process into parts of a predetermined number of bytes (for instance, 188 bytes) and sequentially giving IDs or the like thereto. At this time, the encoder 7 controls the coding operation so that eight video packets V1, V2, V3, . . . , for instance, are generated for one GOP. In this manner, the encoder 7 generates a video signal transport stream TV as a series of video packets V1, V2, V3, . . . .

Figure 2H:
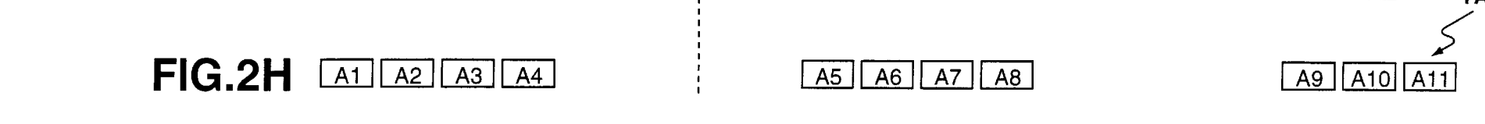

The encoder 7 also divides an audio signal SAM into audio units that approximately correspond to the GOPs of the video signal SV and codes the audio units according to the MPEG scheme. Further, the encoder 7 generates audio packets A1, A2, A3, A4, . . . (see FIG. 2H) by dividing a bit stream that has been obtained by the above coding process into parts of a predetermined number of bytes and giving IDs or the like thereto. At this time, the encoder 7 controls the coding operation so that four audio packets A1, A2, A3, and A4, for instance, are generated for one audio unit. In this manner, the encoder 7 generates an audio signal transport stream TA as a series of audio packets A1, A2, A3, A4, . . .

Figure 2I:
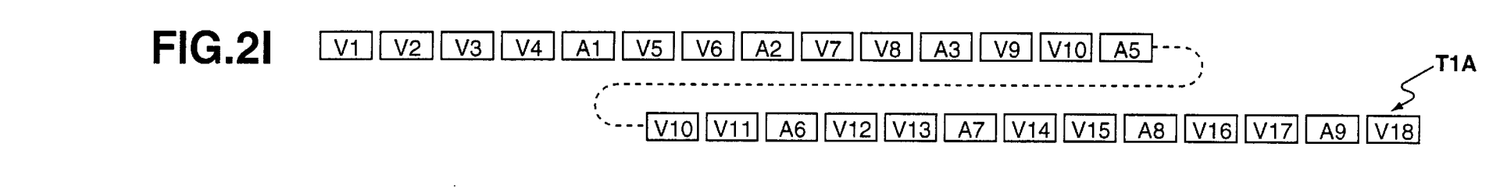
Figure 3A:
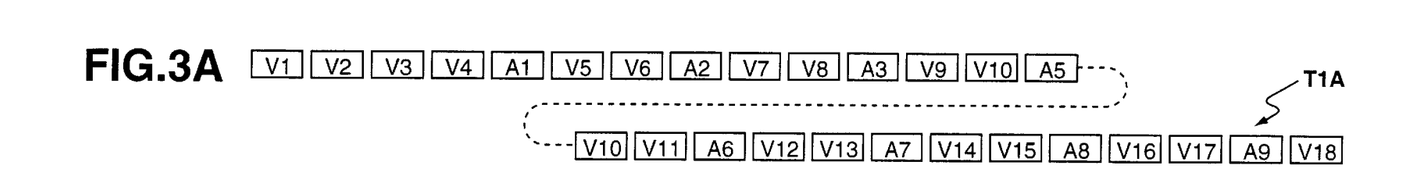
FIGS. 3A–3E are a time chart showing the operation of a reception side of the satellite broadcasting system of FIG. 1.
Figure 3B:
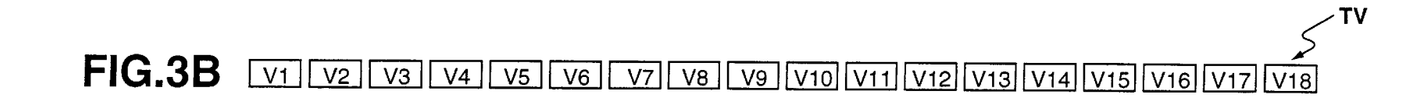
Figure 3C:
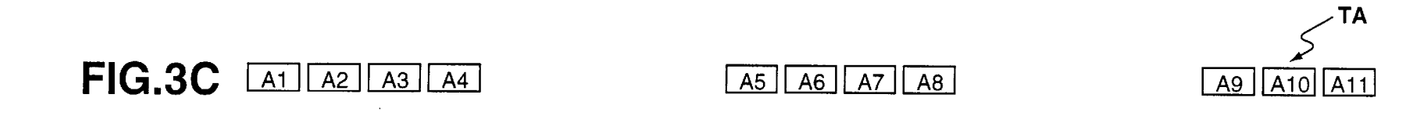
Figure 3D:
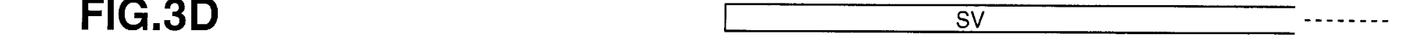
Figure 3E:
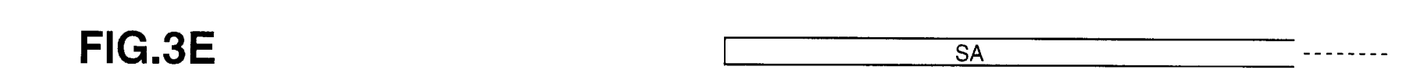

Further the encoder 7 generates a multiplexed transport stream T1A (see FIG. 2I) by multiplexing the thus-generated video packets V1, V2, V3, . . . and audio packets A1, A2, A3, A4, . . . To allow the decoding side to reduce the buffer memory capacity, in doing the multiplexing the encoder 7 delays the audio packets A1, A2, . . . with respect to the respective video packets V1, V2, . . . by a predetermined time.

The multiplexer 3 time-divisionally multiplexes and outputs multiplexed transport streams T1A–T1N that are output from the respective servers 2A–2N by assigning those to respective transmission packet. In the satellite broadcasting system 1, a multiplexed signal S1 of the multiplexed transport streams T1A–T1N that has been generated in the above manner is up-linked from a terrestrial station to a broadcasting satellite and broadcast from the broadcasting satellite.

In a reception side 8, as shown in FIGS. 3A–3E, a desired multiplexed transport stream T1A (see FIG. 3A) is selected, and then separated into a video signal transport stream TV and an audio signal transport stream TA (see FIGS. 3B and 3C) by a demultiplexer (DMUX) 9A. The video signal transport stream TV and the audio signal transport stream TA are decoded into a video signal SV and an audio signal SA (see FIGS. 3D and 3E) by a decoder (DEC) 9B.

By the way, a multiplexed transport stream that is generated in the above manner has a feature of a smaller data amount than baseband video and audio signals because it is compressed. Therefore, if video signals SV and audio signals SA are stored in the form of multiplexed transport streams T1A–T1N, the capacity of the data storing means such as the hard disk drive 4 could be reduced accordingly, that is, the video signals SV and the audio signals SA could be stored more efficiently. Even in transmitting a video signal SV and an audio signal SA within each server, if they are transmitted after being converted into a multiplexed transport stream, they could be transmitted more efficiently.

Figure 4:
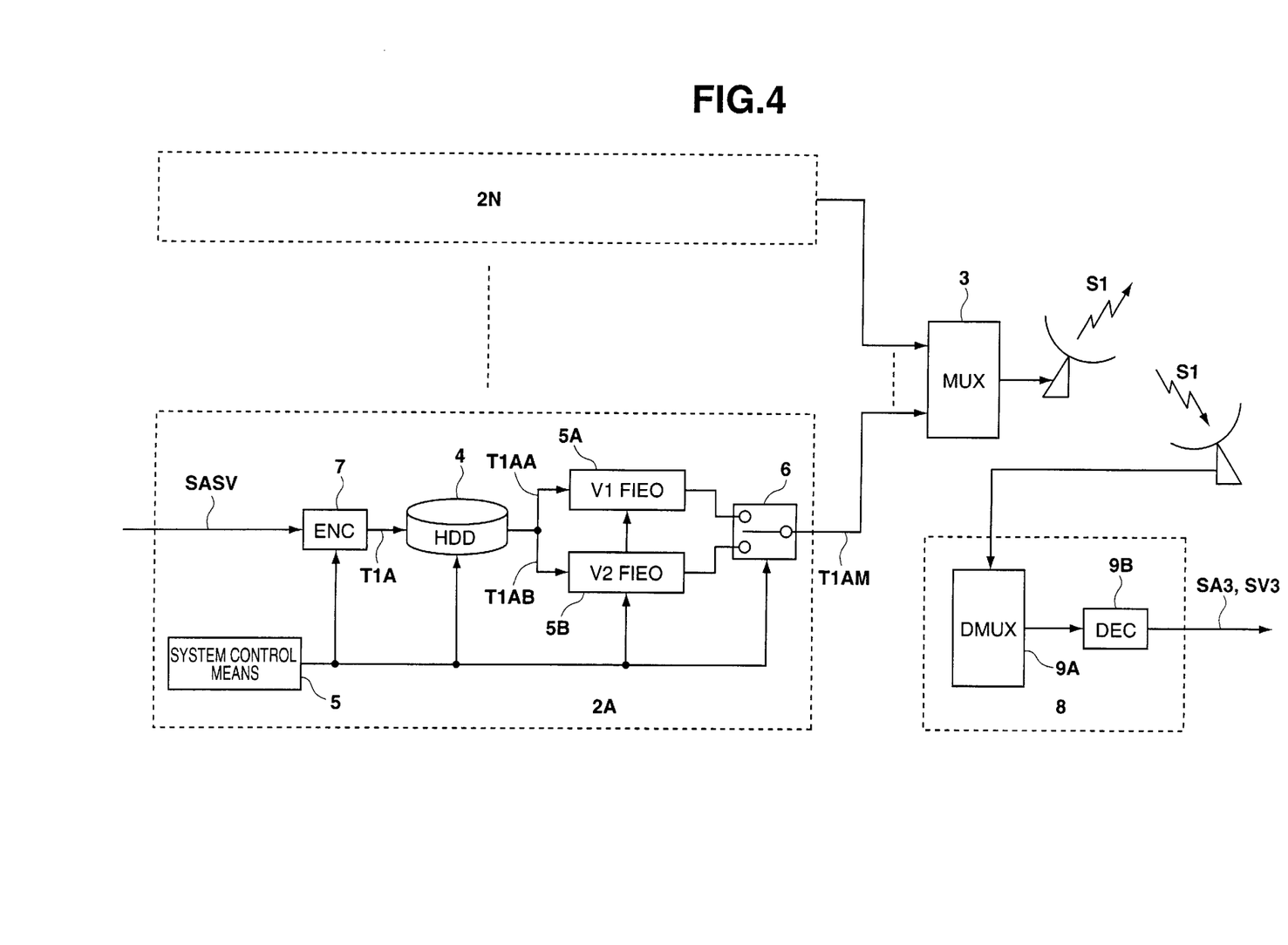
FIG. 4 is a block diagram of a configuration for generating a multiplexed transport stream without utilizing the invention.

FIG. 4 shows a configuration to realize the above concept. A video signal SV and an audio signal SA can be stored after being converted into a multiplexed transport stream by providing the encoder 7 on the input side of the hard disk drive 4.

However, in this configuration, when program switching is made by the selecting means 6, it is difficult for the reception side 8 to decode an audio signal correctly.

In the MPEG scheme, data compression of a video signal is performed by effectively utilizing the correlation between consecutive frames. Therefore, it is difficult to decode a video signal correctly if even one packet is lost for one GOP. For example, as shown in FIGS. 5A–5G, when the program to be broadcast is switched from a first program to a second program switching between the contacts of the selecting means 6 is made at a time point t1 when one GOP of a multiplexed transport stream T1AA of the first program is finished (see FIG. 5A). As for a multiplexed transport stream T1AB of the second program (see FIG. 5B), the selecting means 6 is switched so that a video packet V201 of one GOP is started at the time point t1. In this manner, video packets of a video signal can be arranged so as to become continuous on a GOP basis (see FIG. 5D). In the reception side 8, a video signal SV can be reproduced correctly (see FIG. 5F).

Figure 5A:
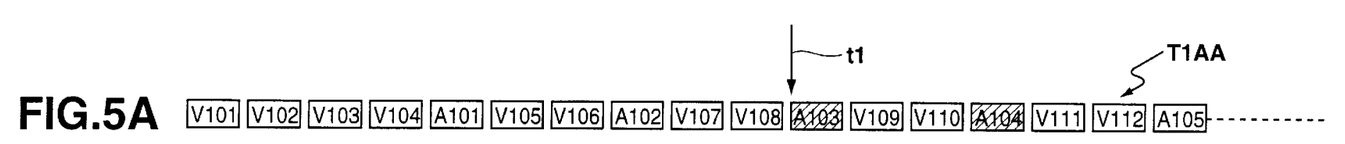
FIGS. 5A–5G are a time chart showing how transport streams are processed in the system of FIG. 4.
Figure 5B:
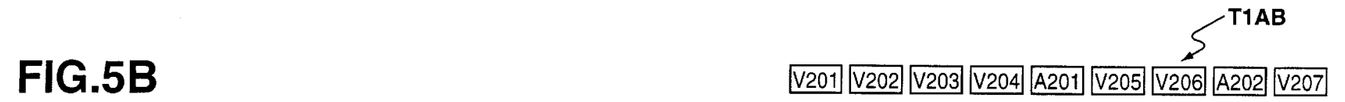
Figure 5C:
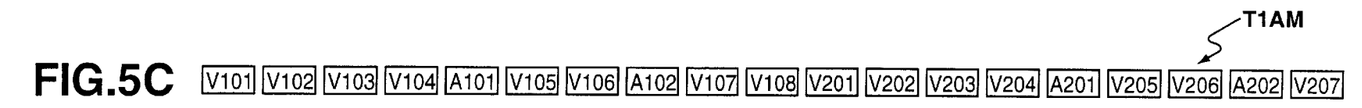
Figure 5D:
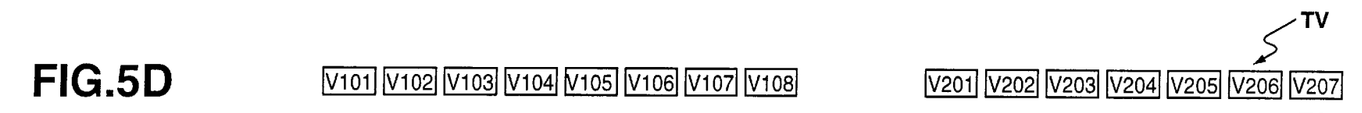
Figure 5E:
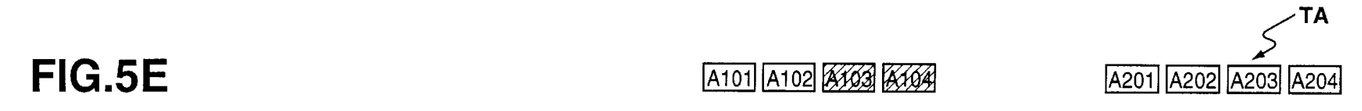
Figure 5F:
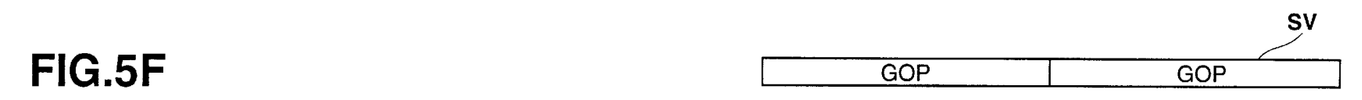

However, if switching between the multiplexed transport streams T1AA and T1AB of two systems is made on a GOP basis, since audio packets are delayed from the respective video packets, audio packets A103 and A104 that constitute the same audio unit are lost (see FIG. 5E).

Figure 5G:
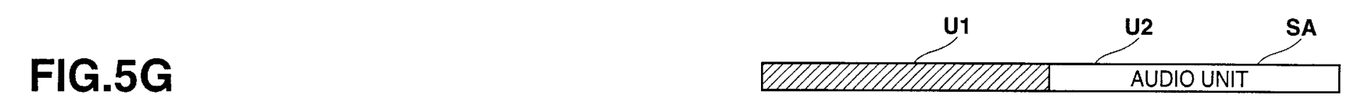

As in the case of a video signal transport stream, if even one packet is lost for one audio unit in an audio signal transport stream, an audio signal SA cannot be decoded correctly (see FIG. 5G). That is, such an audio signal will cause abnormal sound in the reception side 8. Thus, this type of broadcasting system cannot be put into practice.

SUMMARY OF THE INVENTION

The present invention has been made in view of the above, and an object of the invention is therefore to provide a audio-video signal transmission apparatus which can efficiently store and transmit a video signal etc. in a system that transmits a video signal etc. after time-divisionally multiplexing those.

The invention provides an audio-video signal transmission apparatus which generates transmission data by compressing and packetizing a video signal and an audio signal and transmits a plurality of programs that are constituted of packets of the video signal and packets of the audio signal while switching between the plurality of programs, comprising compressing means for compressing a video signal and an audio signal, and for outputting a compressed video signal and audio signal as separable packets; video signal switching means for switching between the packets of the video signal that constitute a plurality of programs; audio signal switching means for switching between the packets of the audio signal that constitute the plurality of programs; control means for switching the video signal switching means and the audio signal switching means in such a manner that when a transmission program is changed from a first program to a second program, none of the packets of the video signal and the packets of the audio signal that constitute the first and second programs are lost; and multiplexing means for time-divisionally multiplexing the packetized video signal and the packetized audio signal that are output from the video signal switching means and the audio signal switching means, respectively.

The above audio-video signal transmission apparatus may further comprise recording means for recording the packets of the compressed video signal and audio signal, wherein the packets are written to and read from the recording means under the control of the control means.

In the above audio-video signal transmission apparatus, the compressing means may compress the video signal and the audio signal according to the MPEG standard.

The above audio-video signal transmission apparatus may further comprise FIFOs of at least two systems for holding the packets that are read from the recording means, the FIFOs of each of the at least two systems being constituted of an FIFO for a video signal and an FIFO for an audio signal.

In the above audio-video signal transmission apparatus, transport stream that has been generated by the multiplexing means through time-divisional multiplexing may be transmitted to a receiving apparatus via a broadcasting satellite.

The above audio-video signal transmission apparatus may further comprise an ATM exchange, wherein a transport stream that has been generated by the multiplexing means through time-divisional multiplexing is transmitted to a receiving apparatus after being converted into ATM packets by the ATM exchange.

Further, the invention provides an audio-video signal transmission method which generates transmission data by compressing and packetizing a video signal and an audio signal and transmits a plurality of programs that are constituted of packets of the video signal and packets of the audio signal while switching between the plurality of programs, comprising the steps of compressing and packetizing a video signal and an audio signal; separating packets of the compressed video signal and packets of the compressed audio signal into a plurality of systems for a video signal that correspond to the number of programs and a plurality of systems for an audio signal that correspond to the number of programs; outputting packets of the video signal and packets of the audio signal that constitute the respective programs without losing none of those packets while switching a transmission system from one system to another; and time-divisionally multiplexing the output, packetized video signal and audio signal.

DETAILED DESCRIPTION OF THE PREFERRED EMBODIMENT

An embodiment of the present invention will be hereinafter described with reference to the accompanying drawings.

Figure 6:
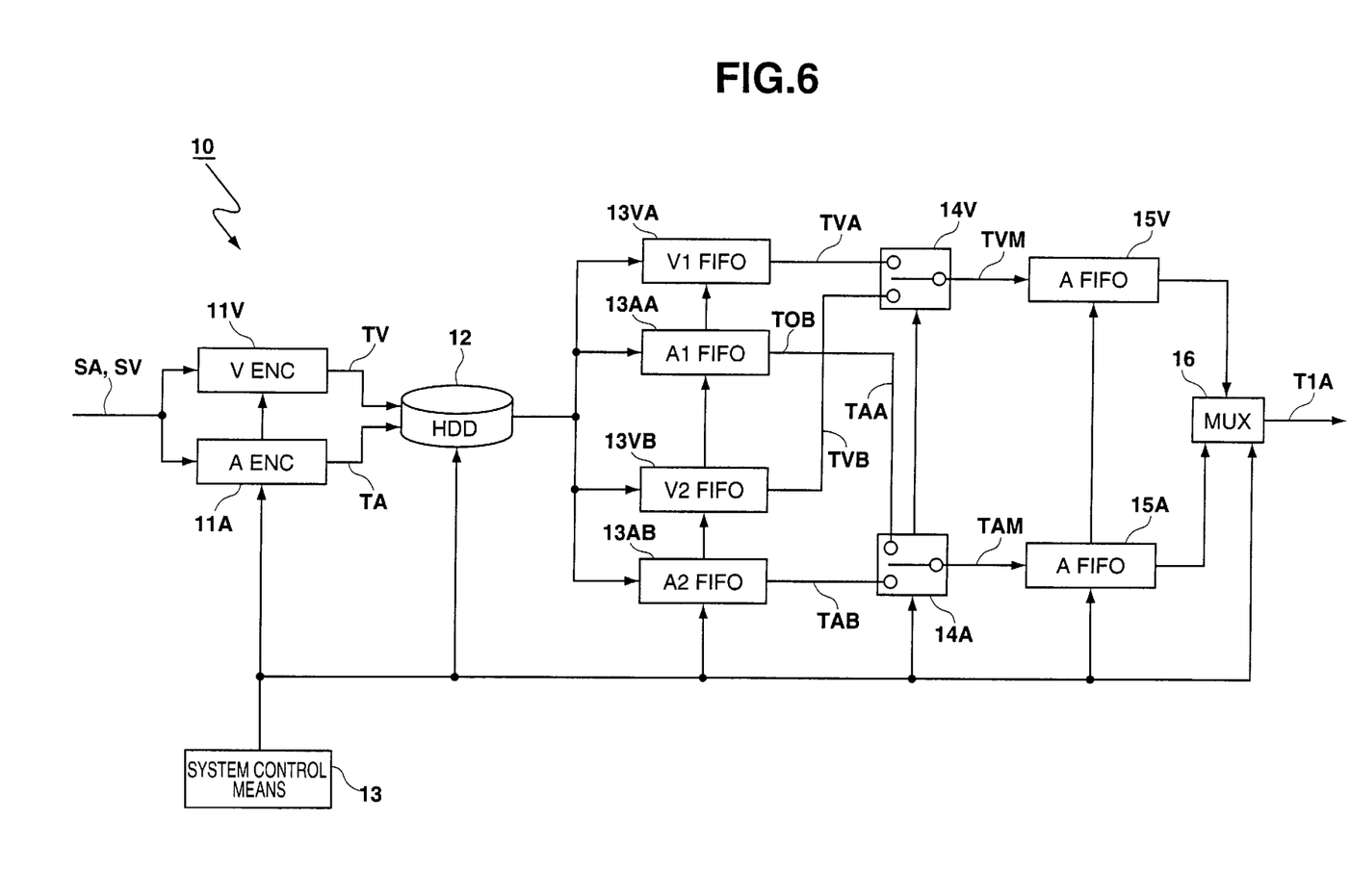
FIG. 6 is a block diagram of an audio-video signal transmission apparatus according to an embodiment of the present invention that is applied to a satellite broadcasting system.

FIG. 6 is a block diagram showing a server 10 according to the embodiment of the invention. The server 10 is used in place of each of the above-described servers 2A–2N shown in FIG. 1.

In the server 10, a video encoder (V ENC) 11V data-compresses a video signal SV that is sequentially input by coding it according to the MPEG scheme, and outputs its transport stream TV.

An audio encoder (A ENC) 11A data-compresses an audio signal AV that is sequentially input by coding it according to the MPEG scheme, and outputs its transport stream TA.

A hard disk drive (HDD) 12 stores and outputs transport streams TV and TA of the video signal SA and the audio signal SA under the control of a system control means 13. The hard disk drive 12 records and manages the transport streams of the video signal SV and the audio signal AV as separate files.

For example, a video FIFO (V1 FIFO) 13VA sequentially receives, from the hard disk drive 12, and outputs a transport stream TVA of a video signal SV of a program that is currently broadcast. An audio FIFO (A1 FIFO) 13AA sequentially receives and outputs a transport stream TAA of an audio signal SA corresponding to the transport stream TVA of the video signal SV.

On the other hand, for example, a video FIFO (V2 FIFO) 13VB sequentially receives, from the hard disk drive 12, and outputs a transport stream TVB of a video signal of a commercial message that will be broadcast next. An audio FIFO (A2 FIFO) 13AB sequentially receives and outputs a transport stream TAB of an audio signal SA corresponding to the transport stream TVB of the video signal SV.

A selecting means 14V selects and outputs one of the video signal transport streams TVA and TVB that are output from the video FIFOs 13VA and 13VB, respectively, by switching between the contacts under the control of the system control means 13. In this manner, the server 10 sequentially outputs video signal transport streams TVA and TVB according to a preset transmission list, for instance.

On the other hand, a selecting means 14A selects and outputs one of the audio signal transport stream TAA and TAB that are output from the audio FIFOs 13AA and 13AB, respectively, by switching between the contacts so as to correspond to the operation of the selecting means 14V under the control of the system control means 13. In this manner, the server 10 sequentially outputs an audio signal transport stream TAM that corresponds to a video signal transport stream TVM that is output from the selecting means 14V.

A video FIFO (V FIFO) 15V holds and outputs the video signal transport stream TVM that is output from the selecting means 14V, under the control of the system control means 13. An audio FIFO (A FIFO) 15A holds and outputs, with predetermined timing, the audio signal transport stream TAM that is output from the selecting means 14A, under the control of the system control means 13. A multiplexer 16 outputs a multiplexed transport stream T1A by multiplexing the video signal transport stream TVM and the audio signal transport stream TAM that are output from the video FIFO 15V and the audio FIFO 15A, respectively. In the satellite broadcasting system to which the server 10 is applied, the multiplexed transport stream T1A is subjected to further multiplexing and a resulting multiplexed transport stream is broadcast.

Figure 7:
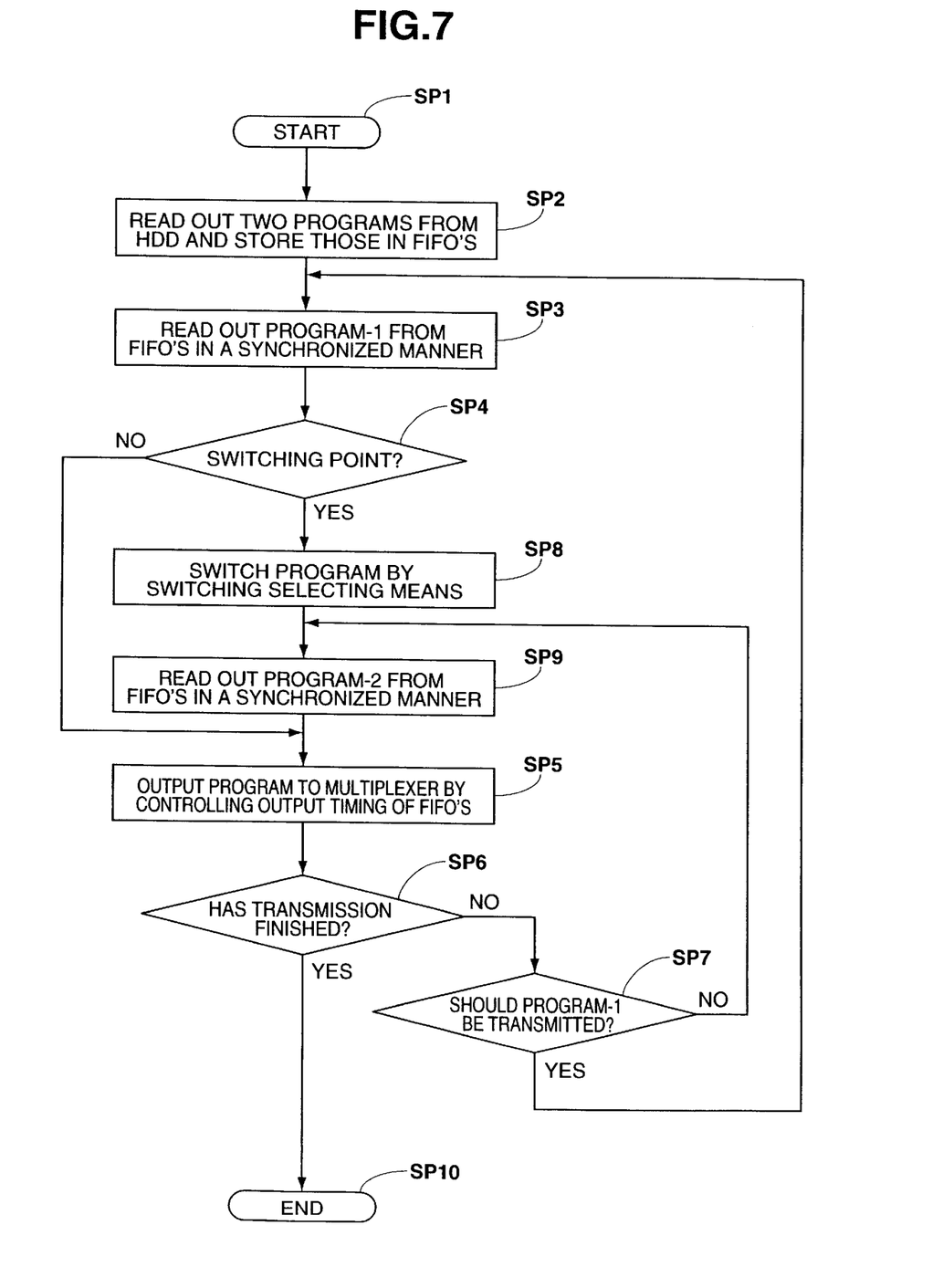
FIG. 7 is a flowchart showing the operation of a system control means in the audio-video signal transmission apparatus of FIG. 6.

FIG. 7 is a flowchart showing a process to be executed by the system control means 13. When the server 10 is started up, the system control means 13 causes a video signal transport stream TVA and a corresponding audio signal transport stream TAA on a GOP basis and on an audio unit basis, respectively, from the hard disk drive 12 according to a transmission list. Further, the system control means 13 causes the read-out transport streams TVA and TAA to be sequentially supplied to the multiplexer 16 via the video and audio FIFOs 13VA and 13AA, the selecting means 14V and 14A, and the video and audio FIFOs 15V and 15A.

Figure 8A:
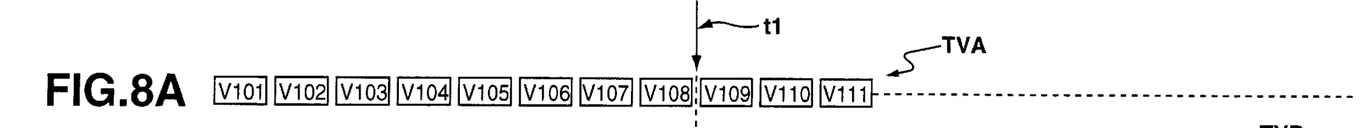
FIGS. 8A–8G are a time chart showing the operation of the audio-video signal transmission apparatus of FIG. 6.
Figure 8B:
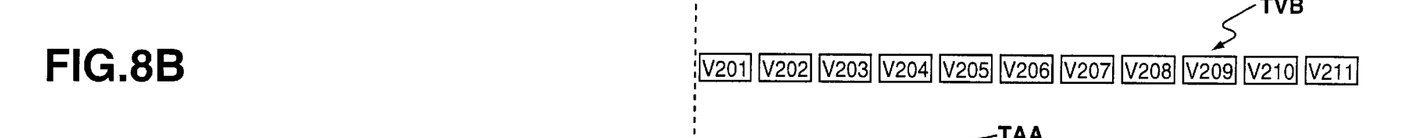
Figures 8C, 8D, 8E, 8F:
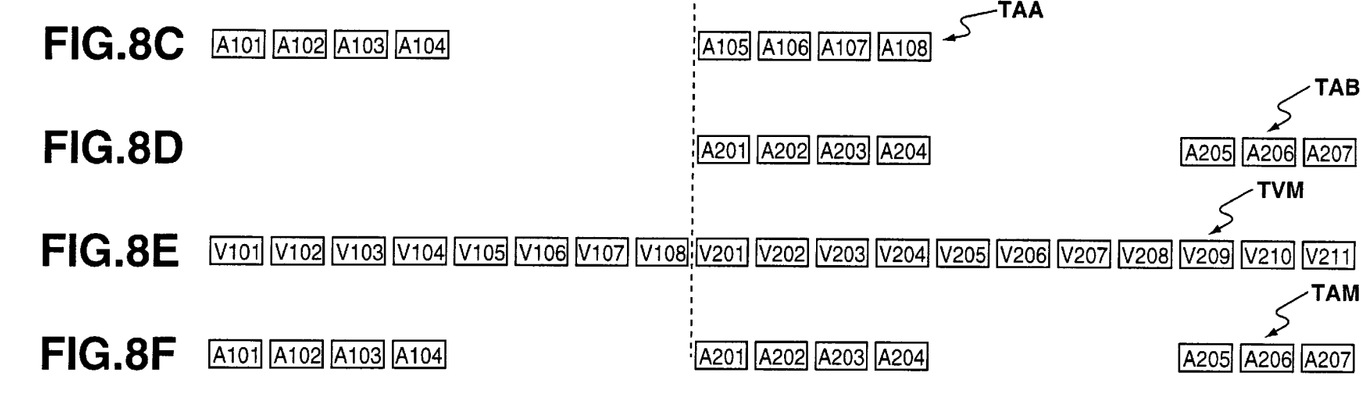
Figure 8G:
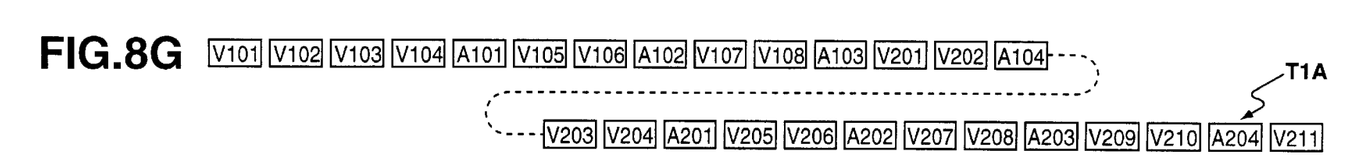

In this manner, the system control means 13 causes the multiplexer 16 to generate a multiplexed transport stream T1A from the transport streams TVA and TAA that are output from the video FIFO 15V and the audio FIFO 15A, respectively, and to output it (see FIGS. 8A, 8C, and 8G).

In this state, when it becomes close to a switching point t1, the process goes from step SP1 to step SP2, where the system control means 13 causes one GOP and one audio unit of a program that will be output next (consisting of a video signal transport stream TVB and a corresponding audio signal transport stream TAB) as well as one GOP and one audio unit of the program that is currently output (consisting of the video signal transport stream TVA and the corresponding audio signal transport stream TAA) to be read out from the hard disk drive 12.

Further, the system control means 13 causes the transport streams TVA and TAA of the program that is currently output to be supplied to the video FIFO 13VA and the audio FIFO 13AA, respectively, and causes the transport streams TVB and TAB of the program that will be output next to be stored in the video FIFO 13VB and the audio FIFO 13AB, respectively.

Then, the process goes to step SP3, where the system control means 13 the transport streams TVA and TAA of the program that is currently broadcast to be read out from the video FIFO 13VA and the audio FIFO 13AA, respectively, so that they are synchronized with each other, and then to be supplied to the FIFOs 15V and 15A, respectively. When the transport stream TVA of one GOP has been output, the process goes to step SP4.

At step SP4, the system control means 13 judges whether a switching point has been reached. If the judgment result is negative, the process goes to step SP5, where the system control means 13 controls the timing of the FIFOs 15V and 15A to cause the transport streams TVA and TAA of one GOP and one audio unit to be output from the FIFOs 15V and 15A, respectively, to the multiplexer 16.

The process then goes to step SP6, where the system control means 13 judges based on the transmission list whether the program transmission has been finished. If the judgment result is negative, the process goes to step SP7, where the system control means 13 judges whether the program to be transmitted now is the first program that is held by the FIFOs 13VA and 13AA. If the judgment result is affirmative, the process returns to step SP3.

In the above manner, the steps SP3–SP7 are repeated in this order in the state that the transport streams TVB and TAB of the program to be transmitted next is held by the FIFOs 13VB and 13AB, whereby the system control means 13 causes the transport streams TVA and TVB of the first program to be multiplexed and transmitted.

When a program switching point is reached after the repetition of steps SP3–SP7, the process goes to step SP8 as a result of a change, to affirmation, of the judgment result of step SP4. At step SP8, the system control means 13 performs a control to switch between the contacts of the selecting means 14V and 14A.

Then, the process goes to step SP9, where the system control means 13 causes the transport streams TVB and TAB to be read out from the FIFOs 13VB and 13AB and supplied to the multiplexer 16 via the selecting means 14V and 14A. In the above manner, the system control means 13 causes generation of a multiplexed transport stream T1A while causing switching between the video signal transport streams TVA and TVB and switching between the audio signal transport streams TAA and TAB to be made separately.

That is, in the server 10, a transport stream TVM is output such that after the first transport stream TVA is continuously output via the video signal side switching means 14V, the second transport stream TVB is output continuously on a GOP basis from the end of a GOP of the first transport stream TVA (see FIGS. 8A, 8B, and 8E). Similarly, an transport stream TAM is output such that after the first transport stream TAA is continuously output via the audio signal side switching means 14A, the second transport stream TAB is output continuously on an audio unit basis from the end of an audio unit of the first transport stream TAA (see FIGS. 8C, 8D, and 8F). Further, a multiplexed transport stream T1A is generated by time-divisionally multiplexing the transport stream TVM and TAM by arranging the video packets and the audio packets that constitute the transport streams TVM and TAM, respectively, in prescribed order (see FIG. 8G).

When the transmission of the second program is started in the above manner, the process goes from step SP9 to step SP5, where the system control means 13 causes generation of a multiplexed transport stream T1A of the second program. At the next step SP6, the system control means 13 judges whether the program has been finished. If the judgment result is negative, the process goes to step SP7. In the example under consideration, the transmission of the second program results in a negative judgment result at step SP7 and hence the process goes to step SP9. At step SP9, the system control means 13 causes the FIFOs 13VB and 13AB to receive the transport streams TVB and TAV of the second program and to output those to the selecting means 14V and 14A, respectively.

In this manner, the system control means 13 causes steps SP9, SP5, SP6, and SP7 to be repeated in this order for the second program. When the transmission of the second program is finished, an affirmative judgment result is obtained at step SP6. Therefore, the process goes to step SP10 and is finished there.

In the above configuration, a video signal SV and an audio signal SA that are input to each server 10 (see FIG. 6) are data-compressed through coding according to the MPEG scheme and resulting transport streams TV and TA are stored in the hard disk drive 12 as separate files. In this manner, the video signal SV and the audio signal SA are stored and transmitted more efficiently than in a case where they are stored in the form of baseband signals.

The video signal transport stream TV and the audio signal transport stream TA that are stored in the hard disk drive 12 as separate files are read out from the hard disk drive 12 according to respective timing schedules that suits a transmission list while the file management is performed individually. The read-out transport streams TV and TA are supplied to the multiplexer 16, where they are converted into a multiplexed transport stream T1A.

The satellite broadcasting system further time-divisionally multiplexes multiplexed transport streams that are generated by the respective servers and broadcasts a resulting multiplexed transport stream.

When the multiplexed transport stream T1A is generated, the transport streams TV and TA that are stored in the hard disk drive 12 are read out from the hard disk drive 12 on a GOP or audio unit basis by individual file management and then multiplexed. Further, switching is made between the above transport streams TV and TA and transport streams TV and TA of another program.

Figures 9A, 9B:
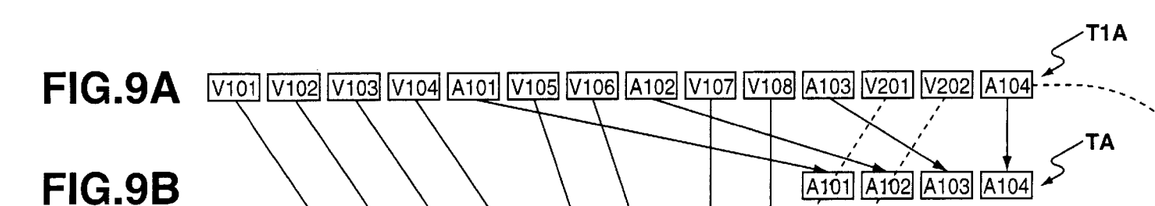
FIG. 9A–9G are a time chart showing the operation of a multiplexed transport stream reception side.
Figure 9C:
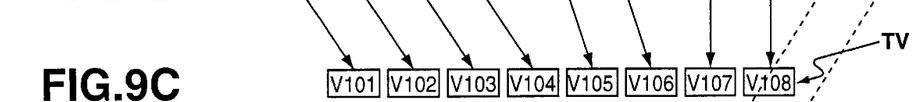
Figures 9D, 9E:
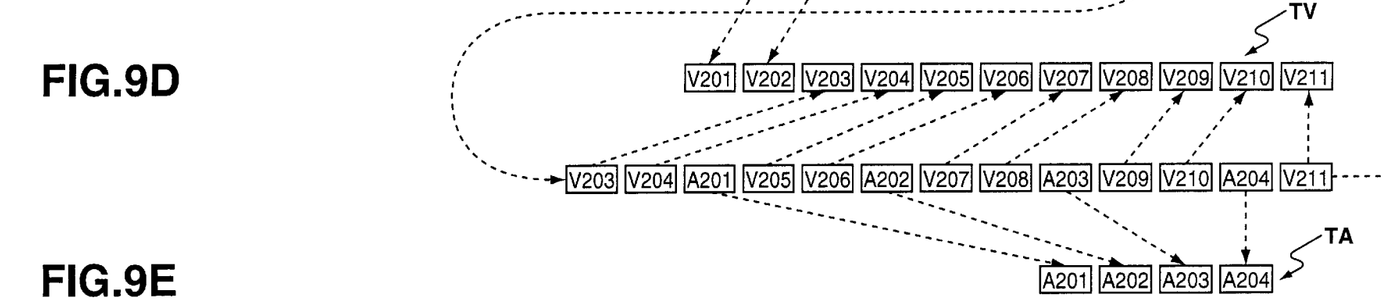

In the reception side 8, the multiplexed transport stream T1A (see FIG. 9A) is separated into the audio signal transport streams TA (see FIGS. 9B and 9E) and video signal transport streams TV (see FIGS. 9C and 9D) by using the IDs of the respective packets. That is, the transport streams TA and TV can be separated from each other on an audio unit or GOP basis. The audio signal SA and the video signal SV can be reproduced by decoding the transport streams TA and TV (see FIGS. 9G and 9F).

Figure 9F:
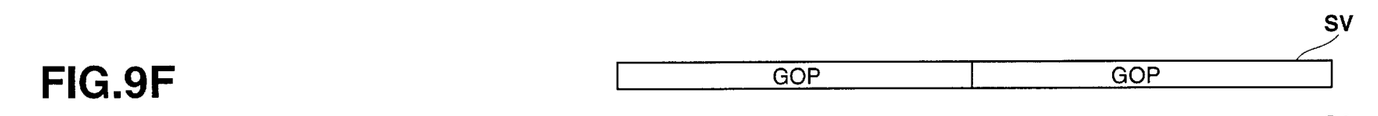
Figure 9G:
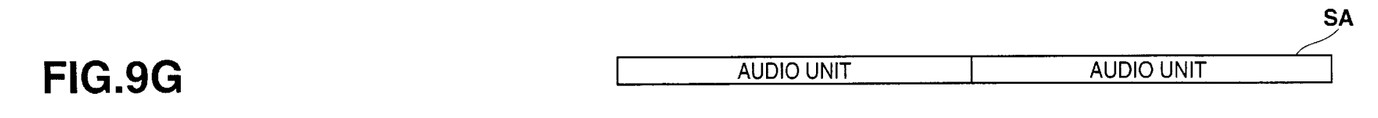

Since the video signal SV and the audio signal SA are decoded on a GOP basis and an audio unit basis, respectively, deterioration in picture quality, generation of abnormal sound, etc. can be avoided effectively in the decoding operation.

With the above configuration, a video signal SV and an audio signal SA are converted into respective transport streams TV and TA which are then stored by individual file management. Therefore, the video signal SV and the audio signal SA can be stored and transmitted efficiently while deterioration in picture quality, generation of abnormal sound, etc. can be avoided effectively.

Although the above embodiment is directed to the case where transport streams TV and TA are edited on a GOP basis and an audio unit basis, respectively, the invention is not limited to such a case and the essential thing is to edit those in units of coding. For example, the invention can also be applied to a case where the edit operation is performed on a 2-GOP basis and a 2-audio-unit basis.

Although the above embodiment is directed to the case where one commercial message is inserted into one program, the invention can also be applied to a case where switching is made among a plurality of sources for insertion into one program.

Although the above embodiment is directed to the case where a multiplexed transport stream is generated from a one-channel video signal and a one-channel audio signal, the invention is not limited to such a case. The invention can also be applied to a case where a multiplexed transport stream is generated from a one-channel video signal and audio signals of a plurality of channels as well as a case where a multiplexed transport stream is generated from video and audio signals plus text information, for instance.

Although the above embodiment is directed to the case where multiplexed transport streams are further multiplexed and then satellite-broadcast, the invention is not limited to such a case. It is possible to transmit data through a network based on various protocols. For example, data may be transmitted through a network in the form of ATM (asynchronous transfer mode) packets by adding a well-known ATM exchange to the audio-video signal transmission apparatus of the embodiment.

Although in the embodiment the MPEG scheme is employed as the compression scheme, the invention is not limited to such a case and any compression scheme can be used as long as a video signal and an audio signal are separately packetized.

Although in the embodiment the hard disk drive is used as the recording device for packetized signals, other recording devices having more than a predetermined storage capacity may be used. Examples of other usable media are a DVD, a magnet-optical disk, and a phase change disk.

Further, according to the above embodiment, the process may be executed either in a hardware-like manner by using dedicated circuits or in a software-like manner by using a general-purpose CPU.

What is claimed is:

1. An audio-video signal transmission apparatus which generates transmission data from a plurality of input program feeds, each said input program feed comprised of a video signal and an audio signal; said apparatus comprised of:

compressing means for compressing said video signal and said audio signal corresponding to each said input program feed, and for outputting a compressed video signal and audio signal in the form of separable packets;

video signal switching means for separating the packets of said video signals from the packets of said audio signals for each said input program feed;

audio signal switching means for separating the packets of said audio signals from the packets of said video signals for each said input program feed;

control means for controlling the video signal switching means and the audio signal switching means in such a manner as to form a video stream and an audio stream containing the packets from each said program feed in a contiguous sequence;

multiplexing means for time-divisionally multiplexing said video stream with said audio stream into a single transmission stream containing said packets from each said input program feed;

recording means for recording the packets of the compressed video signal and audio signal, wherein the packets are read from the recording means under the control of the control means and coupled to the respective video and audio signal switching means for switching; and first-in first-out buffers (FIFOs) of at least two systems for buffering the packets that are read from the recording means, the FIFOs of each of the at least two systems being constituted by a FIFO for buffering the read video signal and a FIFO for buffering the read audio signal wherein each system buffers corresponding audio and video signal packets of a respective program.

2. The audio-video signal transmission apparatus according to claim 1, wherein the compressing means compresses the video signal and the audio signal according to the MPEG standard.

3. The audio-video signal transmission apparatus according to claim 1, wherein a transport stream that has been generated by the multiplexing means through time-divisional multiplexing is transmitted to a receiving apparatus via a broadcasting satellite.

4. An audio-video signal transmission apparatus which generates transmission data by compressing and packetizing a video signal and an audio signal and transmits a plurality of programs that are constituted by packets of the video signal and packets of the audio signal while switching between the plurality of programs, comprising.

compressing means for compressing said video signal and said audio signal, and for outputting a compressed video signal and audio signal in the form of separable packets;

video signal switching means for switching between the packets of the video signal that constitute the plurality of programs;

audio signal switching means for switching between the packets of the audio signal that constitute the plurality of programs;

control means for switching the video signal switching means and the audio signal switching means for switching at a switching point between first and second programs in such a manner that a number of packets of the video and audio signals of the first program occurring after the switching point which corresponds to a number of packets of the first program before the switching point are selected;

multiplexing means for time-divisionally multiplexing the packetized video signal and the packetized audio signal that are output from the video signal switching means and the audio signal switching means, respectively; and an asynchronous transfer mode (ATM) exchange, wherein a transport stream that has been generated by the multiplexing means through time-divisional multiplexing is transmitted to a receiving apparatus after being converted into ATM packets by the ATM exchange.

5. An audio-video signal transmission method which generates transmission data from a plurality of input program feeds, each said input program feed comprised of a video signal and an audio signal; comprising the steps of:

compressing and packetizing said video signal and said audio signal corresponding to each said input program feed, recording the packets of the compressed video signal and audio signal, and outputting a compressed video signal and audio signal in the form of separable packets;

separating packets of the compressed video signal and packets of the compressed audio signal in accordance with said program feeds;

buffering the separated packets in first-in first-out buffers (FIFOs) of at least two systems, the FIFOs of each of the at least two systems being constituted by a FIFO for buffering the read video signal and a FIFO for buffering the read audio signal wherein each system buffers corresponding audio and video signal packets of a respective program;

switching between the buffered packets of the video signal and the buffered packets of the audio signal in such a manner as to form a video stream and an audio stream containing the packets from each said input program feed in a contiguous sequence; and time-divisionally multiplexing said video stream with said audio stream into a single transmission stream containing said packets from each said input program feed.

6. The method according to claim 5, further comprising the step of recording the compressed and packetized video an audio signal packets.

7. The method according to claim 6, further comprising the steps of reading the recorded audio and video packets; and buffering the read audio and video packets corresponding to a first program feed separately from the read audio and video packets corresponding to a second program feed.

8. The method according to claim 7, wherein the step of switching switches between the buffered video packets of the first and second programs and separately switches between the buffered audio packets of the first and second programs.

9. The method according to claim 7, further comprising the step of buffering the switched audio and video packets; wherein said time-divisionally multiplexing step multiplexes the buffered video packets with the buffered audio packets.

10. The method according to claim 5, wherein the number of audio and video packets corresponding to a first program feed is unequal, so that first program audio packets are multiplexed with video packets corresponding to a second program.

11. An audio-video signal transmission apparatus which generates transmission data by compressing and packetizing a video signal and an audio signal, wherein said video and audio signals are baseband signals; and transmits a plurality of programs that are constituted by packets of the video signal and packets of the audio signal while switching between the plurality of programs, comprising:

compressing means for compressing said video signal and said audio signal, to encode the baseband video and audio signals in the form of separable non-baseband packets;

video signal switching means for switching between the packets of the video signal that constitute the plurality of programs;

audio signal switching means for switching between the packets of the audio signal that constitute the plurality of programs;

control means for switching the video signal switching means and the audio signal switching means for switching at a switching point between first and second programs in such a manner that a number of packets of the video and audio signals of the first program occurring after the switching point which corresponds to a number of packets of the first program before the switching point are selected;

multiplexing means for time-divisionally multiplexing the packetized video signal and the packetized audio signal that are output from the video signal switching means and the audio signal switching means, respectively;

recording means for recording the packets of the compressed video signal and audio signal, wherein the packets are read from the recording means under the control of the control means and coupled to the respective video and audio signal switching means for switching; and first-in first-out buffers (FIFOs) of at least two systems for buffering the packets that are read from the recording means, the FIFOs of each of the at least two systems being constituted by a FIFO for buffering the read video signal and a FIFO for buffering the read audio signal wherein each system buffers corresponding audio and video signal packets of a respective program.

12. The apparatus according to claim 11, wherein said video signal switching means switches between the packets of the video signal of each system and the audio switching means switches between the packets of the audio signal of each system.

13. The apparatus according to claim 12, further comprising a video buffer for buffering the switched video packets and a buffer for buffering the switched audio packets.

14. The apparatus according to claim 13, wherein said multiplexing means is a multiplexer which multiplexes the buffered video signal and the buffered audio signals.

15. The apparatus according to claim 14, wherein said recording means stores the packets of video and audio signals as separate files.

16. An audio-video signal transmission apparatus which generates transmission data from a plurality of input program feeds, each said input program feed comprised of a video signal and an audio signal; said apparatus comprised of:

compressing means for compressing said video signal and said audio signal corresponding to each said input program feed, and for outputting a compressed video signal and audio signal in the form of separable packets;

video signal switching means for separating the packets of said video signals from the packets of said audio signals for each said input program feed;

audio signal switching means for separating the packets of said audio signals from the packets of said video signals for each said input program feed;

control means for controlling the video signal switching means and the audio signal switching means in such a manner as to form a video stream and an audio stream containing the packets from each said program feed in a contiguous sequence; wherein said control means causes the audio signal switching means to continue switching a number of audio packets occurring after all video packets corresponding to the same input program feed have switched; and multiplexing means for time-divisionally multiplexing said video stream with said audio stream into a single transmission stream containing said packets from each said input program feed.

* * * * *